United States Patent
Zimmermann et al.

(10) Patent No.: US 10,929,908 B2
(45) Date of Patent: *Feb. 23, 2021

(54) METHOD FOR ACQUISITION AND DISTRIBUTION OF PRODUCT PRICE INFORMATION

(71) Applicant: Sony Corporation, Tokyo (JP)

(72) Inventors: Klaus Zimmermann, Neckartenzlingen (DE); Aurel Bordewieck, Kirchheim/Teck (DE)

(73) Assignee: SONY CORPORATION, Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 16/199,525

(22) Filed: Nov. 26, 2018

(65) Prior Publication Data
US 2019/0095972 A1 Mar. 28, 2019

Related U.S. Application Data

(63) Continuation of application No. 14/061,110, filed on Oct. 23, 2013, now Pat. No. 10,140,643.

(30) Foreign Application Priority Data

Nov. 21, 2012 (EP) .................................... 12007850

(51) Int. Cl.
*G06Q 30/00* (2012.01)
*G06Q 30/06* (2012.01)
(52) U.S. Cl.
CPC ................ *G06Q 30/0623* (2013.01)
(58) Field of Classification Search
CPC ................................................ G06Q 30/0623
(Continued)

(56) References Cited

U.S. PATENT DOCUMENTS

| | | | |
|---|---|---|---|
| 7,200,612 B2 | 4/2007 | Brady et al. | |
| 7,617,111 B1 | 11/2009 | Sheppard et al. | |

(Continued)

FOREIGN PATENT DOCUMENTS

| | | | |
|---|---|---|---|
| CN | 102063616 A | 5/2011 | |
| CN | 102096876 A | 6/2011 | |

(Continued)

OTHER PUBLICATIONS

Virupama Bulusu, et al., "Participatory Sensing in Commerce: Using Mobile Camera Phones to Track Market Price Dispersion", Nov. 2008, 5 pages.

(Continued)

*Primary Examiner* — Robert M Pond
(74) *Attorney, Agent, or Firm* — Xsensus LLP

(57) ABSTRACT

A method for determining product price information, includes capturing a data signal including image data, voice data, and/or keypad input data, the captured data signal including information related to a price of a product, to a point of retail of the product and to a type of the product; determining metadata including a geographic position of the capturing and a time of the capturing; determining a piece of product price information including the type of the product, the price of the product, and the point of retail by analyzing the captured data signal; determining credibility data of the piece of product price information; and including the piece of product price information, the metadata and the respective credibility data into a database.

14 Claims, 9 Drawing Sheets

(58) Field of Classification Search
USPC .................................................. 705/26, 27
See application file for complete search history.

(56) References Cited

U.S. PATENT DOCUMENTS

| | | |
|---|---|---|
| 7,805,223 B2 | 9/2010 | Yamaguchi et al. |
| 8,018,487 B2 | 9/2011 | Reiner |
| 8,428,969 B2 | 4/2013 | Hahn et al. |
| 8,532,419 B2 | 9/2013 | Coleman |
| 8,538,795 B2 | 9/2013 | Fell et al. |
| 2005/0073443 A1 | 4/2005 | Sheha et al. |
| 2006/0218057 A1 | 9/2006 | Fitzpatrick et al. |
| 2007/0264003 A1 | 11/2007 | Voronov |
| 2008/0105482 A1 | 5/2008 | Yamaguchi et al. |
| 2008/0268876 A1 | 10/2008 | Gelfand et al. |
| 2008/0276186 A1 | 11/2008 | Feduszczak et al. |
| 2008/0313014 A1 | 12/2008 | Fell et al. |
| 2009/0157487 A1 | 6/2009 | Cottrell et al. |
| 2011/0118978 A1 | 5/2011 | Li |
| 2013/0015952 A1 | 1/2013 | Menczel et al. |

FOREIGN PATENT DOCUMENTS

| | | |
|---|---|---|
| CN | 102479368 A | 5/2012 |
| JP | 2008-165652 A | 7/2008 |
| JP | 2009-25878 A | 2/2009 |
| JP | 2009-294757 A | 12/2009 |

OTHER PUBLICATIONS

Y.F. Dong, et al., "Automatic Collection of Fuel Prices from a Network of Mobile Cameras", 2008, 17 pages.

Dong et al., "Automatic Image Captureing and Processing for PetrolWatch," IEEE Xplore, Mar. 15, 2012, 9 pages.

Dong et al., "Automatic Collection of Fuel Prices From a Network of Mobile Cameras," Distributed Computing in Sensor Systems. 4th IEEE International Conference, DCOSS, 2008, 17pgs.

Chinese Office Action dated Jan. 19, 2018 in Chinese Application No. 2013105894542 w/English Translation.

METHOD FOR ACQUISITION AND DISTRIBUTION OF PRODUCT PRICE INFORMATION

CROSS-REFERENCE TO RELATED APPLICATION

The present application is a continuation of U.S. application Ser. No. 14/061,110, filed Oct. 23, 2013, and claims priority to European Patent Application 12007850.6, filed in the European Patent Office on Nov. 21, 2012, the entire contents of each of which being incorporated herein by reference

BACKGROUND

Field of the Disclosure

An embodiment of the disclosure relates to a method of determining product price information. Further embodiments of the disclosure relate to a mobile device, a server, a system, a computer program and a non-transitory computer-readable medium for determining product price information.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Presently, methods and devices for determining and comparing product price information, such as e.g. fuel price information, rely on manual data acquisition, which to the largest extent is being performed voluntarily by participants manually entering and assigning product price information, e.g. a fuel price, to a specific retailer. The frequency with which pricing information is updated is often low, and the accuracy thus rather poor.

Accordingly, there is a need for a method, system and devices allowing determining and comparing product price information with a high accuracy and reliability, thereby leading to a good user acceptance.

This object is solved by a method, a mobile device, a server, a system, a computer program and a non-transitory computer-readable medium according to the independent claims.

SUMMARY

A method for determining product price information includes capturing a data signal including image data, voice data and/or keypad input data, the captured data signal including information related to a price of product, to a point of retail of the product and to a type of the product, determining metadata including a geographic position of the capturing and a time of the capturing, determining a piece of product price information including the type of the product, the price of the product, and the point of retail by analyzing the captured data signal, determining credibility data of the piece of product price information, and including the piece of product price information, the metadata and the respective credibility information into a database.

A mobile device includes a capturing device including a still image camera, a video recorder, a microphone and/or a keypad adapted to capture a data signal relating to at least one of a price of a product, a type of the product, a point of retail, a document of retail and voice information, a clock for determining a time of capturing, a position detection device adapted to detect a geographic position at the time of capturing, and a communication interface adapted to transmit, to a server over a network, at least one of the captured data signal together with metadata including the time of capturing and the geographic position of capturing and a piece of product price information derived from the captured data signal together with the metadata.

A server includes a communication interface adapted to receive input data including information related to a type of a product, to a price of the product, and to a point of retail, the input data further including metadata, the metadata including a time of capturing of a data signal from which data signal the information is derived, and a geographic position of the capturing of the data signal, a storage accessor adapted to access a local and/or remote storage, further adapted to transmit a piece of product price information including the type of the product, the price of the product, and the point of retail together with the metadata to the storage.

A system for determining product price information includes a plurality of mobile devices as described above, and at least one server as described above, wherein credibility data of the piece of product price information is determined at one of the plurality of the mobile devices and/or at the server.

A computer program includes computer-program instructions, which when executed by a computer, cause the computer to perform method as described in the above.

A non-transitory computer-readable medium includes the computer program described above.

The foregoing paragraphs have been provided by general introduction, and are not intended to limit the scope of the following claims. The described embodiments, together with the further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and of many of the intended advantages thereof will be readily obtained as the same becomes better understood by reference to the following detailed description when considered in connection with the accompanying drawings, wherein.

DESCRIPTION OF THE EMBODIMENTS

Figure 1:
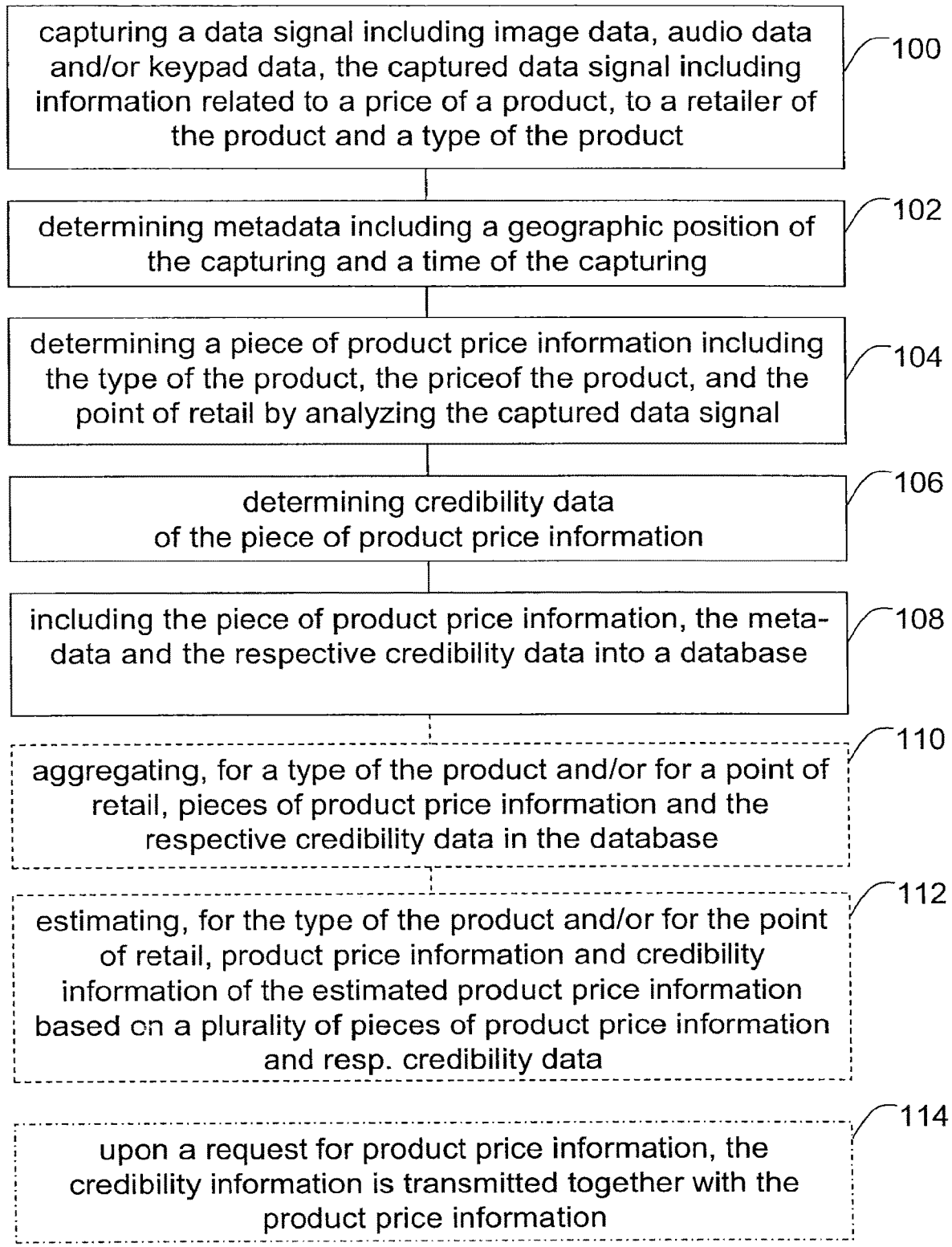
FIG. 1 illustrates a method for determining product price information.

Referring now to the drawings, wherein like reference numerals designate identical or corresponding parts throughout the several views, FIG. 1 illustrates a method for determining product price information.

At 100, a data signal including image data, voice data and/or keypad input data is captured. The data signal may for example include a still image, a moving image such as a sequence of video frames or video data. The still or moving image data may be captured by a camera including an optical lens system and a storage for storing the image data. The data signal may further include voice data, such as a speech uttered by a user, and/or audio data captured e.g. by a microphone. Further, the data signal may include keypad input data, i.e. data representing and/or encoding a sequence of inputs entered by a user e.g. by touching keys provided on a keyboard and/or on a touch pad, i.e. touch sensitive display device.

The device capturing the data signal may thus include a camera for still or moving images, a microphone, a keyboard, keypad and/or touch-sensitive display device, and further a storage for storing the captured data signal. It may, for example, be a mobile device carried by the user, such as mobile phone or smartphone, or a device integrated in a mobile system, such as a camera system or microphone included in a car driven by the user, or may also be a stationary device such as a fixedly installed still image or video camera, optionally including a microphone.

The captured data signal includes information related to a price of a product, to a point of retail of the product, and to a type of the product. This information may be included e.g. as a part of the captured image data, as a part of the keypad input data, and/or as a part of the captured voice data. The information may e.g. be included in a semantic content recognizable from the image data and/or in a semantic content of the voice data, e.g. of a speech recorded by the microphone, and or may be encoded in a character string entered by the keypad.

The capturing of the data signal may be explicitly triggered by the user. For example, the user of a mobile device may explicitly capture images of the point of retail of the product, e.g. of a sign publishing an offer of the product, and/or of a customer receipt when having bought the product. For example, the data signal may include an image of a fuel pump at which a price of a fuel is indicated.

Alternatively or in addition, the user may enter the data signal explicitly as a voice input, e.g. speech input into the microphone. Entering a voice input may be convenient, since it requires very little interaction with the capturing device, e.g. no or very little interaction with keys of the device. Thus, a speech input may conveniently be entered by a user e.g. passing by a gas station in his car, checking the fuel price offers by his eyesight. While it may be difficult for the user to capture image data of the fuel price offers, e.g. since having to focus at the offer signs with his camera, it may be easy for him to enter the information as a voice input into a dictation device e.g. integrated in an arbitrary device, such as a smartphone, a portable computer or a car communication system. For example, the user may activate the dictation device by any action that may be required for activating the device, e.g. by uttering a speech command into the device, by lifting the device, by tilting the device and/or by pressing a "dictation" button. By any of these actions, the device may be activated, even if it has been idle at this time, e.g. in a stand-by mode. Then, the user may utter and capture a speech input summarizing the offers. While capturing the speech input, the user may stay in touch with his driving equipment/steering wheel, as often required by the authorities of specific countries, which allows him to safely continue his road.

The capturing of the data signal may further happen automatically, i.e. without a triggering event expressly entered by the user. For example, if a camera of the mobile device or of a car camera system recognizes image data of a product offer, a product retailer, a service station or point of retail of fuel, the image data may automatically be recorded as the data signal. Thus, the capturing of the data signal may happen in a fully automatic manner, i.e. without explicit user interaction. The user may or may not be informed about the capturing.

The user may enter and/or capture the data signal, may the recording be implicit or explicit, since he wishes to participate in a community of users sharing product price information, e.g. fuel price information.

The product may be any kind of product of which pricing information may be of interest for a user, e.g. a product which is available for consumers at various point of retail or points of service having e.g. differing prices. For example, the product may be fuel, food or edible good, such as butter, beer, meet or orange juice, a basket of available or personally predetermined goods required by a user, such as his typical Saturday shopping basket, an electronic device such as a television set, a service such as car wash, a rental price e.g. for renting a car, a room rate at a hotel/motel and/or a price for hardware at a building supplies store, i.e. home improvement store. Thus, pricing information may be of interest for consumers when determining which point of retail to address, e.g. to go to.

The price of the product may be a price of a unit, e.g. a price to be paid for a predetermined measure of capacity, such as 500 g butter or a liter or a gallon of fuel, or may be a total price for a single piece of the product or for an overall quantity to be sold.

The retailer of the product may for example be a grocery, a hotel and/or a service station having one or several fuel pumps. The retailer may further have advertising signs promoting prices of different products, e.g. different types of fuel. The types of the fuel may describe different compositions, e.g. according to a custom of a specific country. For example, the type of fuel may include normal fuel, diesel fuel, unleaded fuel and other types of petrol.

At 102, metadata is determined including a geographic position of the capturing and a time of the capturing.

For example, the capturing device may include a position sensor such as a GPS (Global Positioning System) sensor for determining a geographic position, i.e. a location of the device essentially at the moment of capturing. The geographic position may also be determined in another manner, e.g. by evaluating a cell of a cell-based network such as a cell-based telecommunications network in which the capturing device is located at the time of capturing. Further, is the capturing device is fixedly installed, the geographic position may be predetermined and e.g. stored in a storage of the capturing device.

Further, the device may include a clock and/or means for accessing a clock at another device for determining essentially the time of capturing.

At 104, a piece of product price information is determined. The piece of product price information includes the type of the product, e.g. fuel type, the price of the product, e.g. fuel price, and the point of retail, e.g. an offering service station. This information is determined by analyzing the captured data signal.

The analyzing of the captured data signal may be performed by any method of signal processing, e.g. adapted for image data processing and/or voice data processing. These methods may include e.g. optical character recognition, image pattern recognition, speech recognition, voice data analysis, audio feature analysis and/or data signal enhancement, such as enhancement of a sharpness or a contrast, or the like.

The analysis of the captured data signal may be performed at the device, e.g. at the mobile device. This allows an instantaneous determination of the piece of product price information using the processing capabilities of the capturing device.

Alternatively or in addition, the analysis may also be performed at a server, e.g. forming part of a cloud computing environment accessible from the capturing device, providing processing capabilities to the participants of the embodiment of the method. In such a configuration, processing capabilities at the capturing device may be kept low, and extensive methods for data analysis may be used at the server, allowing a high accuracy of recognition.

At 106, credibility data of the piece of product price information is determined. The credibility data may reflect a reliability and/or a trustworthiness of the respective piece of product information.

For example, the credibility data may be determined based on a set of factors contributing to the credibility of the conveyed price information. For example, a "trust score" of the piece of product price information, e.g. fuel price information, may be determined. The trust score may comprise individual factors expressing credibility or trustworthiness, which individual factors can be weighted e.g. in a linear or nonlinear fashion to derive an overall score. For example, each of the factors may be represented by a value between 0 and 1, where 1 reflects total trust worthiness, and 0 reflects that the data is not trustworthy at all.

The credibility data may be regarded as a hypothesis for the probability that the piece of product price information is correct at the time of capturing, e.g. that it reflects the correct price of the product type at the corresponding retailer. Further details for determining the credibility data will be discussed below.

At 108, the piece of product price information, the metadata and the respective credibility data is included into a database. This database may be managed and stored at a central server or at storage capabilities provided in the cloud environment. For example, the database may be stored in a distributed manner at several servers, wherein each of the several servers is located in a certain city and stores pieces of product price information of retailers located in the city.

The above-discussed steps 100 to 108 thus allow obtaining real-time price information according to the "swarm principle". Hence, if a significant number of users participate, quasi real-time price information can be gathered and stored through the employment of many different capturing devices providing the pieces of product price information as derived from the captured data signals in a collaborative fashion.

At 110, it is shown that a step of aggregating, for at least one of a plurality of types of product and/or for at least one of a plurality of points of retail, pieces of product price information and the respective credibility data in the database might be used. Step 110 may for example be used if a plurality of pieces of product price information for a type of a product and a point of retail are available.

During aggregation, an overall price of the type of the product at the point of retail may be determined. This aggregation may be performed according to any aggregation method known e.g. from statistics. For example, a mean price indicated by the pieces of product price information may be determined. Further, pieces of product price information showing a widely deviating price may be excluded from the aggregation, thus yielding a truncated mean. Further, the aggregation may be based on the respective credibility data. For example, pieces of product price information having a low credibility may be excluded from the aggregation. The pieces of product price information may be weighted, e.g. in a weighted sum, according to their respective credibility.

At optional step 112, for at least one of the plurality of types of product and/or for at least one of the plurality of points of retail, product price information may be estimated, and credibility information of the estimated product price information may be estimated based on a plurality of pieces of product price information and respective credibility data. Thus, an overall estimated price of the type of the product at the point of retail is determined. Further, the respective credibility information reflects the trustworthiness of the overall estimated price of the product.

For estimation, any estimation method e.g. known from statistics may be used. For example, a mean value of the product prices indicated in the pieces of product price information, optionally weighted with the respective credibility data, may be calculated. As for the aggregation, also during the estimation, pieces of product price information having a low credibility may be excluded, thereby leading to a truncated method for estimation (e.g. truncated weighted mean determination). Further, the estimation may also be performed by using a neural network. The estimation method, e.g. the neural network, might for example take into account further factors, such as product price information from neighbouring points of retail, e.g. neighbouring service stations of the same retailer.

In addition to the pieces of product price information, the estimation may be based on further information, e.g. pricing information provided from other information sources, such as prices published by the retailer himself. Thus, a thorough estimation of the price of the type of product at the point of retail, taking into account the pieces of product price information, the credibility data and further sources of information may be performed. Estimation results may be included into the database.

At 114, it is illustrated that upon a request for product price information received at the database, the credibility information is transmitted together with the product price information. For example, users requesting information on product prices, e.g. requesting an indication of points of retail having a low price for a required type of product in an area surrounding the user, do not only receive a list of retailers and the corresponding estimated prices for the product, but further receive credibility information for each of the estimated prices, indicating an overall credibility of the estimated price. Accordingly a user can determine or estimate his own personal risk when driving to a point of retail with the aim of buying the product at the estimated price, that the driving was not worth the effort and the fuel used for this drive has been wasted since the estimated price was incorrect and/or is not available.

For example, if a very low price of the product at a specific point of retail is reported to a user, the user may notice from a low credibility data that the pricing information may not be reliable, e.g. since relying on data, e.g. pieces of product price information, having a poor quality indicated by the respective credibility data.

The method therefore not only provides highly accurate real-time data, but also indicates the credibility of the provided pricing information.

Figure 2:
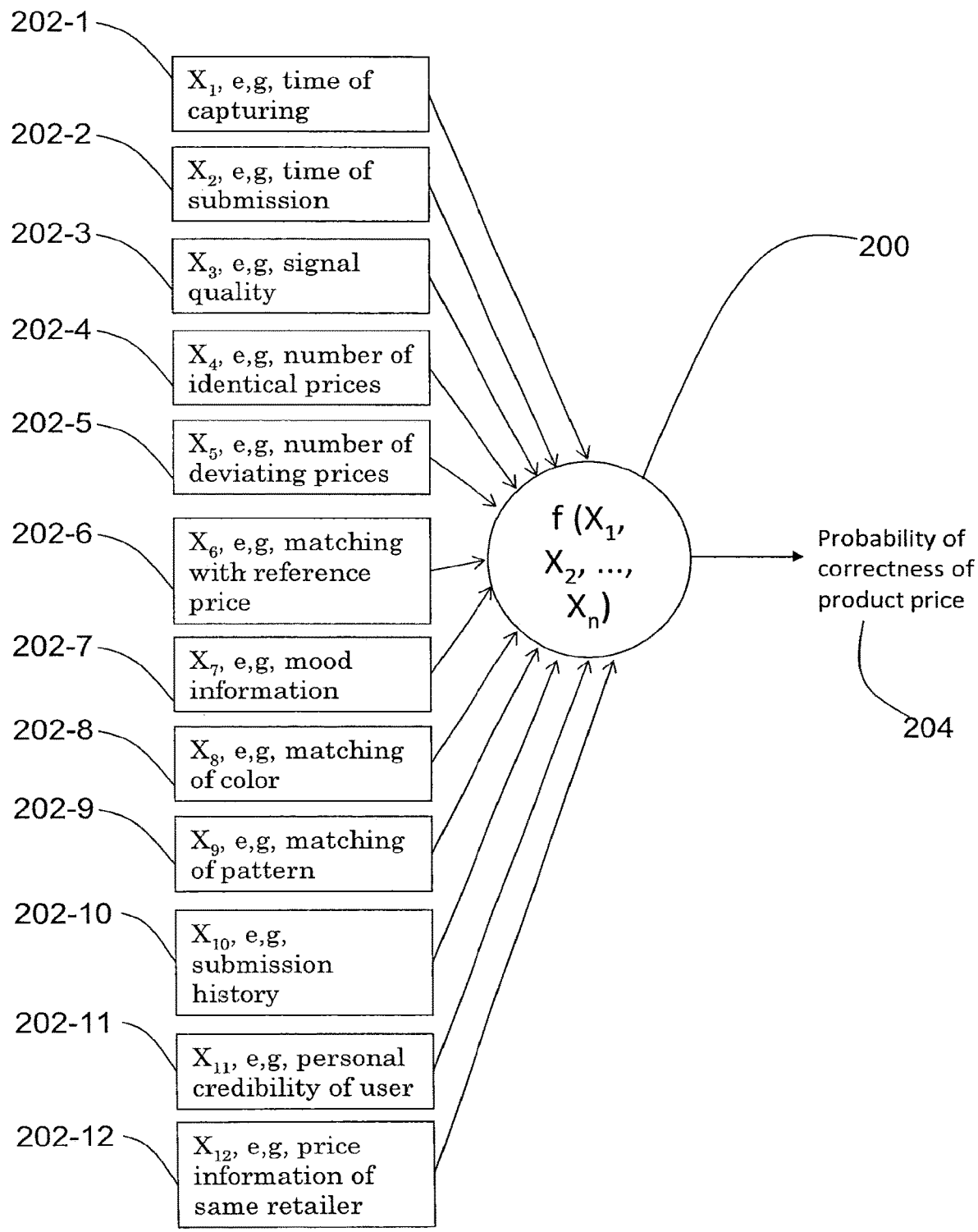
FIG. 2 illustrates a method for assigning credibility data to a respective piece of product price information.

In FIG. 2, determination of the credibility data of a piece of product price information is illustrated, as performed at step 106. The credibility data may be obtained from a function 200 operating on various inputs allowing to determine, e.g. to estimate, the credibility, i.e. trustworthiness of a piece of product price information.

For example, as an input to function 200, the time of capturing the data signal is provided at 202-1. If the time of capturing lies widely in the past, e.g. before a predetermined accepted transmission period of e.g. two hours ago, the corresponding piece of product price information may be considered as having a low credibility. Thus, the metadata may indicate that the piece of product price information is outdated. Further, if the time of capturing lies in the future, it may be supposed that an error made have occurred, such that the piece of product price information may have very low credibility, e.g. near or equal to zero.

Further, function 200 may rely on a time of submission, as illustrated at 202-2. For example, if the time of capturing and the time of submission deviate, this may be an indication for an error and thus for a piece of potentially erroneous product price information. Correspondingly, function 200 may assign credibility data indicating a low credibility.

Further, function 200 may rely on a signal quality, as illustrated at 202-3. For example, if the signal quality, e.g. image quality, is low due to a noisy signal, the corresponding pricing information determined from the data signal may be erroneous, and the credibility data may be set low by function 200.

Further, as illustrated at 202-4, other pieces of product price information may be analyzed. The credibility of the piece of product price information may be high if a high number of other pieces of product price information indicating the same price for the same product at the same point of retail are present.

On the other hand, as illustrated at 202-5, the credibility of a piece of product price information may be low in the presence of a large number of pieces of product price information indicating deviating prices.

Further, as illustrated at 202-6, the piece of product price information may be matched with a reference price, e.g. a price information conveyed by the retailer e.g. on an internet site (reference site). If the piece of product price information deviates from the reference site, its credibility may be low.

Further, as shown at 202-7, mood information may be derived from the data signal. For example, it may be determined whether the user is laughing or shouting. In these cases, the credibility of the respective piece of product price information may be low.

Further, as illustrated at 202-8, further information may be derived from the data signal and may be matched. For example, if the data signal includes image data captured at the point of retail, it may be checked whether a colour present in the image data matches to a colour used by the retailer for marking his points of retail. The presence of the matching colour may be an indication for a high credibility, in particular regarding the point of retail.

Further, as illustrated at 202-9, also a pattern present in the captured data signal, i.e. image data, may be matched with a predefined pattern used by the retailer for marking his points of retail. For example, it may be known that a specific retailer marks his points of retail with a star. If a corresponding star is present in the image data, this may be an indication that the piece of product price information, and in particular the point of retail, is encoded correctly in the piece of product price information.

Further, as shown at 202-10, function 200 may also depend on a submission history e.g. of a specific user or of the capturing device. For example, credibility data of another piece of product price information captured previously at a corresponding device, e.g. the same device or a device of the same user, may be used for determining the credibility data. For example, if a user of a smartphone has previously transmitted erroneous pieces of product price information at several times, the credibility of the newly transmitted piece of product price information may be estimated low.

As shown at 202-11, function 200 may also depend on personal credibility data of the user. For example, personal credibility data may be obtained by analysing the credibility data of pieces of product price information that have been provided by the user in the past. Further, personal credibility data may also be obtained by accessing further information sources, e.g. servers or services accessible via internet. For example, web sites providing social networks or providing market places may evaluate the credibility of their users, e.g. when acting either as customers or as retailers, e.g. by evaluating feedback given to their transactions, payments or the like, thus yielding personal credibility data.

Still further, as shown at 202-12, the product price information may also matched with further information, e.g. price information provided by and/or determined for e.g. neighbouring points of retail of the same retailer.

By function 200, any combination of the above individual factors illustrated by 202-1 to 202-10 may be calculated. For example, function 200 may be realized by a mathematical function, by a set of rules encoded e.g. in a expert system or the like, or by a neural network.

As a result, a probability of correctness of a piece of product price information may be determined and output as the credibility data at 204.

Further, credibility information of an aggregated or estimated price of a product/a type of product, e.g. a type of fuel, at a point of retail may be determined in a corresponding manner, e.g. based on function 200. In this case, the probability is also referred to as the credibility information of the product price information.

The credibility information may be transmitted to a user requesting product price information e.g. together with estimated price information for a type of product at a point of retail. The user, receiving such information, may estimate his own risk regarding the correctness of the pricing information.

The credibility information may be transferred and displayed to the user in various ways, e.g. as a numeric value or coded by colour, e.g. green colour if the credibility of the estimated product price is high, yellow if the credibility of the estimated product price is medium and red if the credibility of the estimated product price is low.

Figure 3:
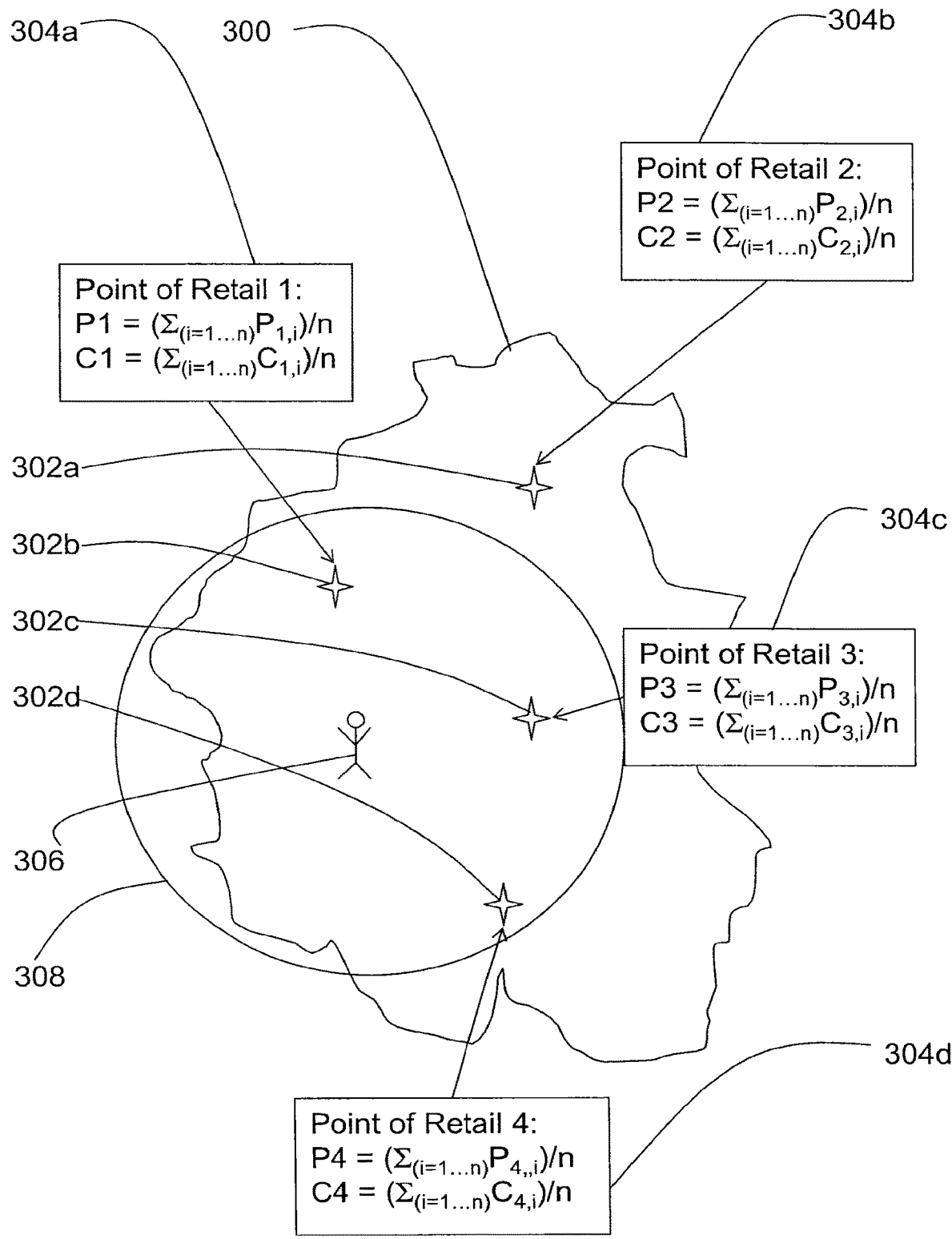
FIG. 3 illustrates a method for determining fuel price information by aggregating, for at least one type of fuel and/or for at least one point of retail, pieces of fuel price information and respective credibility data.

FIG. 3 illustrates the aggregation and estimation of fuel prices, as an example for the aggregation and estimation of product prices of arbitrary products, as well as the aggregation of credibility information in a geographic area 300 with points of retail 1 to 4 denoted by 304a, 304b, 304c and 304d.

In the example depicted, it is assumed that for a specific type of fuel at point of retail 1 304a, pieces of a fuel price information P1,1 to P1,n with respective credibility data C1,1 to C1,n are available. An overall price for the specific fuel type at point of retail 1 304a is then determined by P1 as the mean of the pieces of fuel price information. Accordingly, also the overall credibility C1 of the estimated fuel price P1 is determined by the mean of the respective pieces of credibility data. Corresponding aggregated pricing information is also determined for the points of retail 2 to 4 304b, . . . , 304d.

It should be noted that the aggregated and/or estimated fuel price and the credibility information may also be determined by any other method of aggregation, estimation or calculation, e.g. by a weighted mean of fuel prices, e.g. weighted by the respective credibility data.

If a person 306 requires pricing information regarding a type of fuel in a surrounding environment 308, the aggregated or estimated price information P1, P3 and P4 of the points of retail 304a, 304c and 304d located in surrounding area 308 may be transmitted to person 306 together with the corresponding credibility information C1, C3 and C4. Thus, person 306 may decide to which point of retail to go, taking into consideration the risk that the estimated price information may not be correct.

Figure 4A:
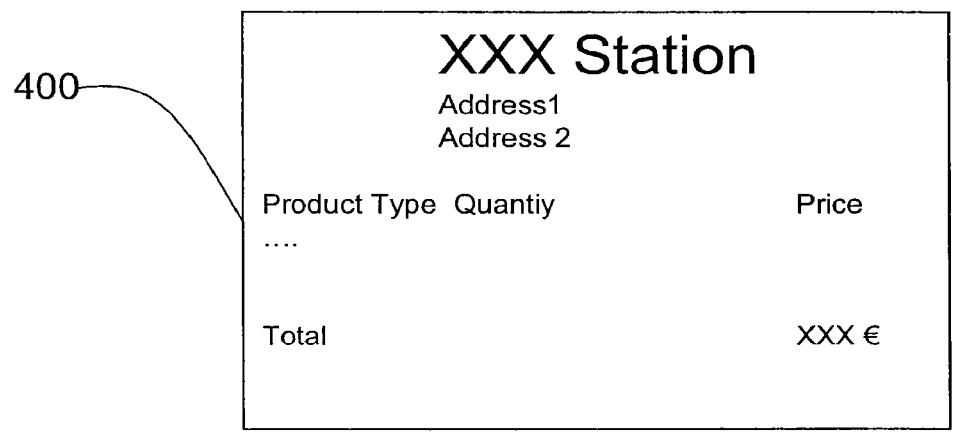
FIG. 4a illustrates image date of a customer receipt including information related to a retailer, a point of retail, a type of a product, a quantity of the product bought and pricing information.
Figure 4B:
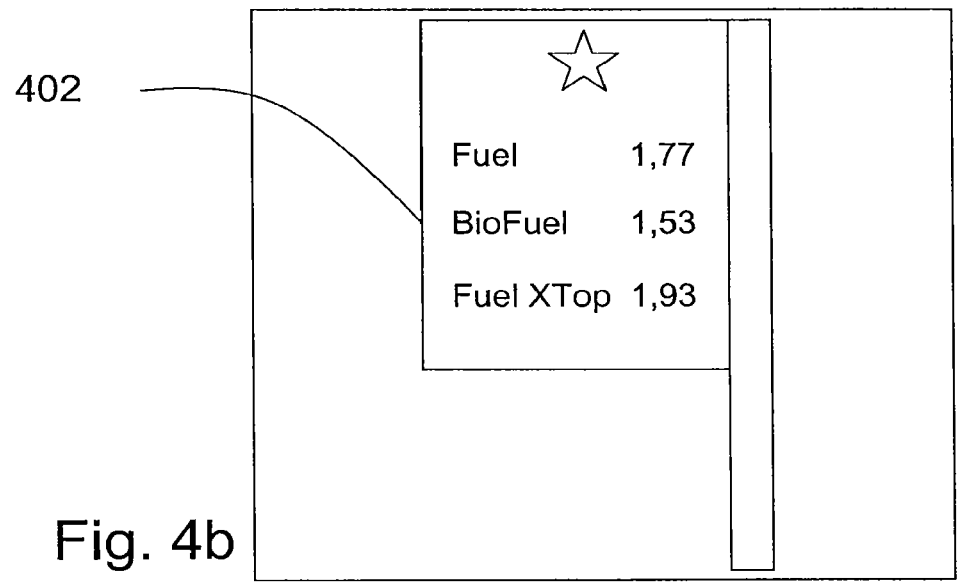
FIG. 4b illustrates image data of a price sign at a fuel station.
Figure 4C:
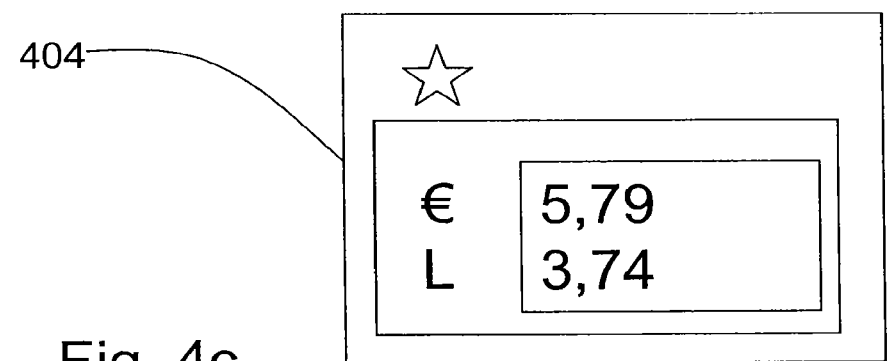
FIG. 4c illustrates image data of price information at a fuel pump.

FIGS. 4a to 4c show image data related to a price of fuel, a retailer of the fuel and a type of the fuel as illustrations of data signals related to product price information.

FIG. 4a shows a captured image of a customer receipt 400 printed at a station XXX, upon which the address of the station is printed, and upon which the product type, the quantity bought and the overall price is indicated. This information may be analyzed from the captured data signal, i.e. from the image data. Thereby, a piece of product price information including the product type, the price and the point of retail may be derived. In the case depicted the product may be fuel or a different type of product, such as oil, milk or wine.

FIG. 4b illustrates an image captured by a car approaching a point of retail, upon which an advertising sign 402 indicating the types of fuel and the corresponding prices is visible. Further, a star forming a pattern used by the retailer for marking his point of retail is depicted. By analyzing the corresponding image data, three pieces of fuel type information including each of the three fuel types and the corresponding fuel price together with the point of retail may be derived. Further, credibility data may be determined based on analysis of the pattern, i.e. the star, indicated on the advertising sign. If, at the geographic location of capturing, a retailer using a star as pattern for marking his points of retail is known to be located, the image data may have a high credibility.

In FIG. 4c, image data 404 captured at a fuel pump is illustrated. From an analysis of the image data, a price of the fuel per measure of quantity may be calculated and thus included in a piece of fuel price information. Further, at the fuel pump, the pattern of the star is visible, thus allowing determining the credibility data, e.g. by checking whether at the geographic location of capturing a retailer using the star as a pattern for marking his points of retail is located.

Figure 5A:
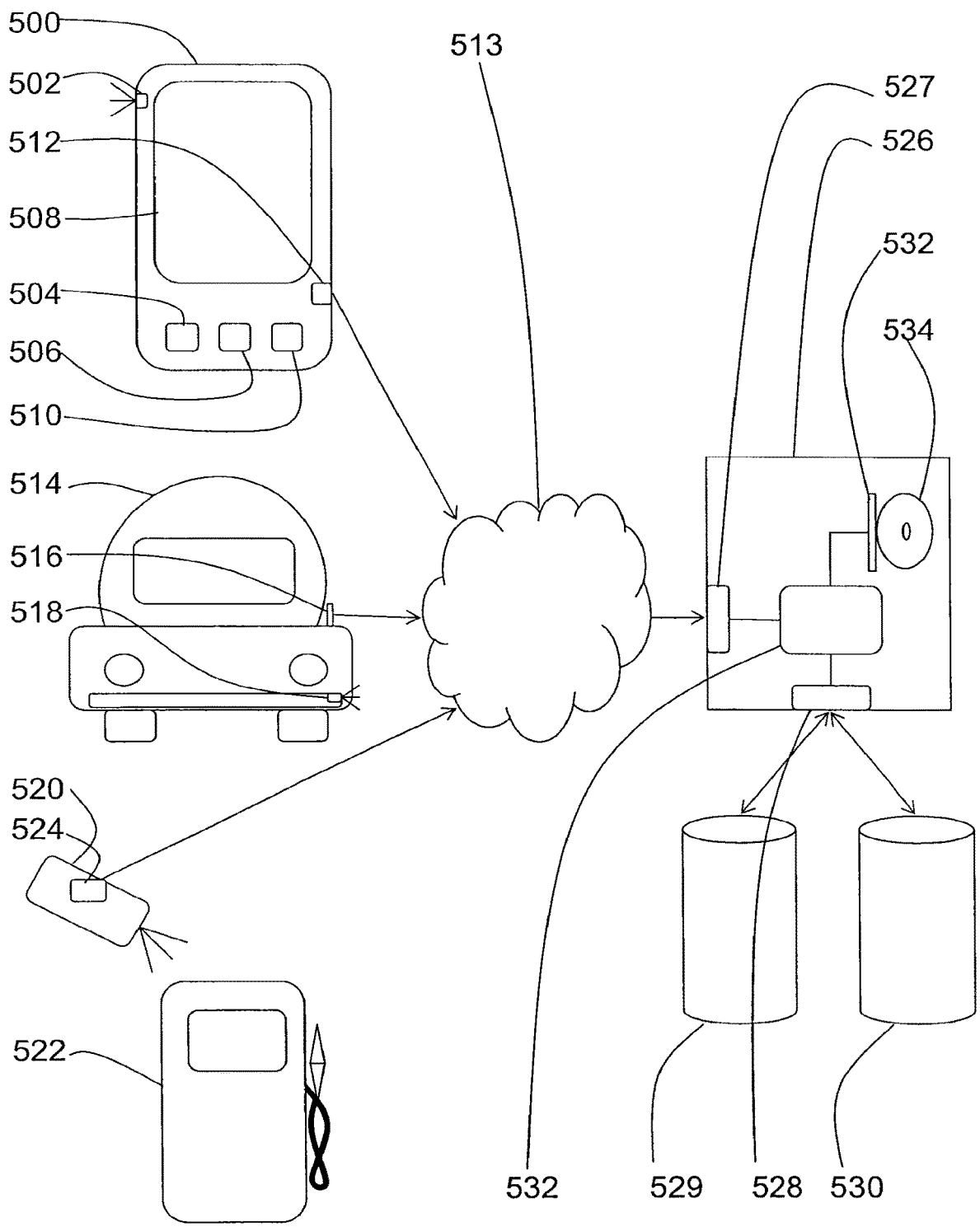
FIG. 5*a* illustrates a system for determining product price information.

In FIG. 5a, a system for determining product price information including capturing devices and a server is illustrated.

It should be noted that the illustration only shows an embodiment of the system, and that the system may also include a cloud environment, e.g. a community cloud or public cloud. It is thus to be understood that the capturing devices as well as the server may be coupled to a cloud computing environment, and that any of the method steps, i.e. any of the tasks to be performed, may be performed by any of the devices included in the cloud computing environment.

Cloud computing is to be understood as a model for enabling ubiquitous, convenient, on-demand network access to a shared pool of configurable computing resources e g networks, servers, storages, applications, and services, that can be rapidly provisioned and released with minimal management effort and/or with minimal or no service provider interaction at all.

Thus, any of the tasks and method steps of embodiments of the method described herein may be performed by any component of the cloud, e.g. by rapid assignment and release. Thus, the applications running in the cloud environment, i.e. provided by the cloud infrastructure, may be provided to the consumers, i.e. users of the capturing devices and users requesting product price information, by rapid assignment and release. The applications may be accessible from the various devices for example through a thin client interface such as a web browser or a program interface.

It should be understood that for the consumer, i.e. user of the various devices, it is not necessary, and further perhaps not possible, to manage or control the underlying cloud infrastructure including network, servers, operating systems, storage, or even individual application capabilities. However, limited user-specified application configuration settings may be possible.

It should further be noted that the system may be designed as a community cloud providing the cloud infrastructure for exclusive use by a specific community of consumers having shared concerns, i.e. the wish to contribute to the determination of product price information and to benefit from the estimated pricing information. The cloud infrastructure may be owned, managed, and operated by one or more of the organizers of the community, by a third party, or by some combination of them, and it may exist on or off premises.

Further, the cloud infrastructure may also be organized as a public cloud provisioned for open use by the general public. It may be owned, managed and operated by a business, academic or government organization, or some combination of them. It may exist on the premises of the cloud provider.

The cloud infrastructure may also be a hybrid cloud, i.e. a composition of two or more distinct cloud infrastructures (private, community, or public) that remain unique entities, but are bound together by standardized and/or proprietary technology that enables data and application portability.

It should further be noted that all definitions of the terms used herein are to be reflected in the cloud computing environment. Accordingly, a stretched interpretation of the terms in the sense of the dynamic attribution of tasks to different cloud structures is possible.

Concluding, any description related to an interaction between the devices shown in FIG. 5a and any assignment of method steps e.g. as shown in FIG. 1 may be subjected to a stretched interpretation and thus may be dynamically shifted in the cloud environment.

A mobile device 500 includes a capturing device 502 including a still image camera, a video recorder, a microphone, and/or a keypad for capturing keypad input data. Capturing device 502 may be adapted to capture data signal relating to at least one of a product price, a product type, a point of retail, a document of retail, voice data and/or keypad input data. Mobile device 500 may further include a clock 504 for determining a time of capturing and a position detection device 506 adapted to detect a geographic position at the time of capturing. For example, a GPS sensor may be included for determining a location depending on the global positioning system. The device may further include e.g. a display 508, and one or more keys 510 for operating the device, e.g. for starting the capturing.

Mobile device 500, as well as any other mobile device discussed herein, may be adapted for use in a system for determining product price information, the system including a processor, the processor being adapted to determine credibility data of a piece of product price information. The processor may be located in the mobile device, in a server of the system or in an any other component of the system, e.g. in the cloud environment.

Still further, mobile device 500 may include a communication interface 512 adapted to transmit, to a server over a network 513 e.g. located in the cloud computing environment, at least one of the captured data signal together with metadata including the time of capturing and the geographic position of capturing and a piece of product price information derived from the captured data signal together with the metadata. Communication interface 512 may be any kind of communication port, such as e.g. an Ethernet port or an interface for wireless communication via a telecommunications network such as an UTMS or LTE network.

As a further device in the cloud computing environment, a car 514 having a communication interface 516 for communicating via network 513 with the cloud computing environment is illustrated. Car 514 includes a camera 518 for capturing still image data or sequences of video frames. Camera 518 may be used as device for capturing the data signal.

As a further component of the cloud, a stationary camera 520 being mounted in a fixed position at a service station so as to capture images of a fuel pump 522 is illustrated. Stationary camera 520 has a communication interface 524 for communicating e.g. via networks 513 with the cloud computing environment. It should be noted that instead of being located at a fuel pump, the camera may also be mounted at a different location or retailer, e.g. so as to capture image data of an advertising sign announcing product prices or at a shelf from which products to be sold are available in a point of retail.

Any of the devices 500, 514 and 520 may be used as the capturing device in the method illustrated in FIG. 1, e.g. for carrying out any one of the steps 100 to 108. However, it is possible that devices 500, 514 and 520 only perform a part of the steps, e.g. only the capturing step 100, and possibly also the determination of the metadata at step 102. In this case, steps 104 to 108 may be performed elsewhere in the cloud computing environment, e.g. at specific servers being adapted e.g. for determining the piece of product price information, for determining the credibility data and/or for including the piece of product price information, the metadata and the respective credibility data into the database.

Further, any of the devices 500, 514 and 520 may include a processor adapted to determine a piece of product price information including the product type, the product price and the point of retail by analyzing the captured data signal. Further, the corresponding communication interfaces 512, 516 and 524 may be adapted to transmit the determined piece of product price information together with the metadata to the server over network 513, e.g. to the cloud computing environment. Thus, step 104 may be performed e.g. by the respective processor of at least one of the devices 500, 514 and 520.

Further, in any of the devices 500, 514 and 520, the processor may be adapted to determine the credibility data of the piece of product price information. Further, the respective communication interfaces 512, 516 and 524 may be adapted to transmit the credibility information together with the determined piece of product price information and/or the captured data signal to a server over e.g. network 513, e.g. to another server in the cloud computing environment. Thus, step 106 may be performed at any of devices 500, 514 and 520.

Further, in any of the devices 500, 514 and 520, a step of capturing, by a microphone, voice data such as audio data including information related to a price of a product, to a retailer of the product and/or to a type of the product may take place. Further, metadata including the geographic position of the capturing and the time of capturing may be determined. Still further, the piece of product price information including the type of the product, the price of the product and the point of retail may be determined by analyzing the captured data signal. The piece of product price information and the metadata may then be included into the database, e.g. located in the cloud computing environment.

Further, a server 526 may be included in the cloud computing environment and may be accessible e.g. via network 513. The server may include a communication interface 527 adapted to receive, e.g. from one of a plurality of mobile devices 500, 514, 520 and/or from a further component of the cloud, input data including information related to a type of a product (e.g. fuel), a price of the product, and point of retail, the input data further including metadata, the metadata including a time of capturing of a data signal from which data signal the information is derived, and a geographic position of the capturing of the data signal. Further, the server 526 may include a storage accessor 528 adapted to access local and/or remote storages 529, 530, wherein the storage accessor 528 is further adapted to transmit the piece of product price information including the type of the product, the price of the product and the point of retail together with the metadata to the storages 529, 530.

The server 526 may further include a processor 532 adapted to determine the piece of product price information by analyzing the information and/or the data signal. Thus, method step 104 may be performed at server 526, as well as on any other server included in the cloud computing environment. Providing analyzing capacities in the cloud computing environment allows keeping the devices 500, 514 and 520 lean. Thus, these devices may be equipped with very little possessing capabilities.

Processor 532 of server 526 may further be adapted to determine and/or to receive, via the communication interface, credibility data related to the information. Thus, method step 106 may either be performed at any of devices 500, 514 and 520, and/or at server 526, or alternatively or in addition at a further server e.g. specifically provided for this task in the cloud computing environment.

Processor 532 of server 526 may further be adapted to determine aggregated and/or estimated product price information by aggregating, for at least one of a plurality of types of a product and/or for at least one of a plurality of points of retail, pieces of product price information and the respective credibility data. Processor 532 may further be adapted for estimating, for at least one of a plurality of types of the product and/or for at least one of a plurality of points of retail, product price information and credibility information as discussed in the above. Further, processor 532 may be adapted to provide the aggregated and/or estimated product price information to storage accessor 528 for transmission to storages 529, 530. Thus, method steps 110 and 112 may be performed at server 526.

Further, processor 532 of server 526 may be adapted to estimate credibility information of the aggregated and/or estimated product price information, e.g. based on the credibility data received from at least one mobile device 500, 514, 520 from which input data is received. Still further, processor 532 may be adapted to provide the credibility information to storage accessor 528 for transmission to storages 529, 530. Thus, server 526, as well as another server in the cloud environment, may estimate the credibility information, which may be provided, together with the aggregated or estimated price information, to a user upon a request.

Thus, as shown in FIG. 5*a*, a system for determining product price information (e.g. fuel price information) may include a plurality of mobile and stationary devices 500, 514 and 520 and at least one server 526, wherein credibility data of the piece of product price information is determined at one of the plurality of the devices 500, 514 and 520 and/or at the server.

Still further, a computer program may include computer-program instructions, which when executed by a computer cause the computer to perform any of the embodiments of the method described herein. For this purpose, server 526 may provide a reading device 532 for reading a non-transitory computer-readable medium 534 including the computer program.

Figure 5B:
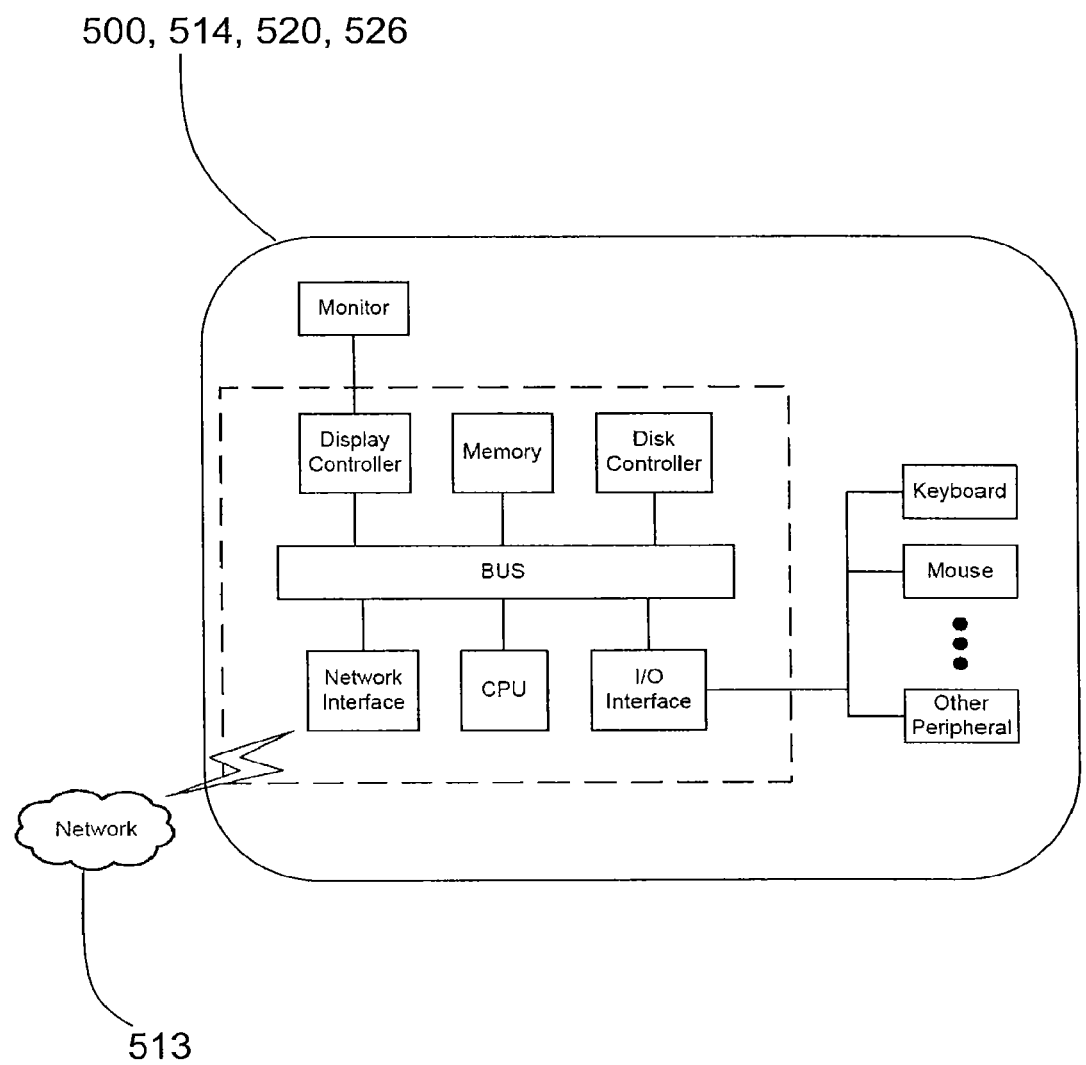
FIG. 5*b* illustrates an embodiment of any of the devices included in the system of FIG. 5*a*.

FIG. 5*b* is a hardware diagram of a processing system embodying aspects of any of the devices 500, 514 and 520 and/or of server 526. Thus, the hardware diagram shows aspects which may be embodied in any of the devices illustrated in FIG. 5*a*.

The processes, algorithms and electronically driven systems described in the following can be implemented via a discrete control device or a computing system consistent with the structure shown in FIG. 5*b*. Such a system is described herein as a processing system.

As shown in FIG. 5*b*, a processing system in accordance with this disclosure can be implemented using a microprocessor or its equivalent, such as a central processing unit (CPU) or at least one application specific processor (ASP) (not shown). The microprocessor utilizes a computer-readable storage medium, such as a memory (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can control a hard disk drive or optical disk drive. The microprocessor or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-core CPU.

In another aspect, results of processing of the input of data in accordance with this disclosure can displayed via a display controller to a monitor. The display controller would then preferably include at least one graphic processing unit for improved computational efficiency. Additionally, an I/O (input/output) interface is provided for inputting data from a keyboard for a pointing device (not shown) for controlling parameters of the various processes and algorithms of this disclosure can be connected to the I/O interface to provide additional functionality and configuration options or control display characteristics. Moreover, the monitor can be provided with a touch-sensitive interface to a command/instruction interface, and other peripherals can be incorporated, including a scanner, a webcam, a still image camera, a video camera and/or a microphone as discussed in the above.

The above-noted components can be coupled to a network, e.g. network 513, and via network 513 to the cloud computing environment. Network 513 may be the internet and/or a local intranet. Connection to the network may be achieved via network interface for the transmission or reception of data, including controllable parameters.

The network 513 provides a communication path to the cloud computing environment, which can be provided by way of packets of data. Additionally, a central BUS is provided to connect the above hardware components together and provides at least one path for digital communication therebetween.

Insofar as embodiments of the disclosure have been described as being implemented, at least in part, by a software-controlled data processing apparatus, it will be appreciated that the non-transitory machine-readable medium carrying such software, such an optical disc, a magnetic disc, semiconductor or the like, is also considered to represent an embodiment of the present disclosure.

Figure 6:
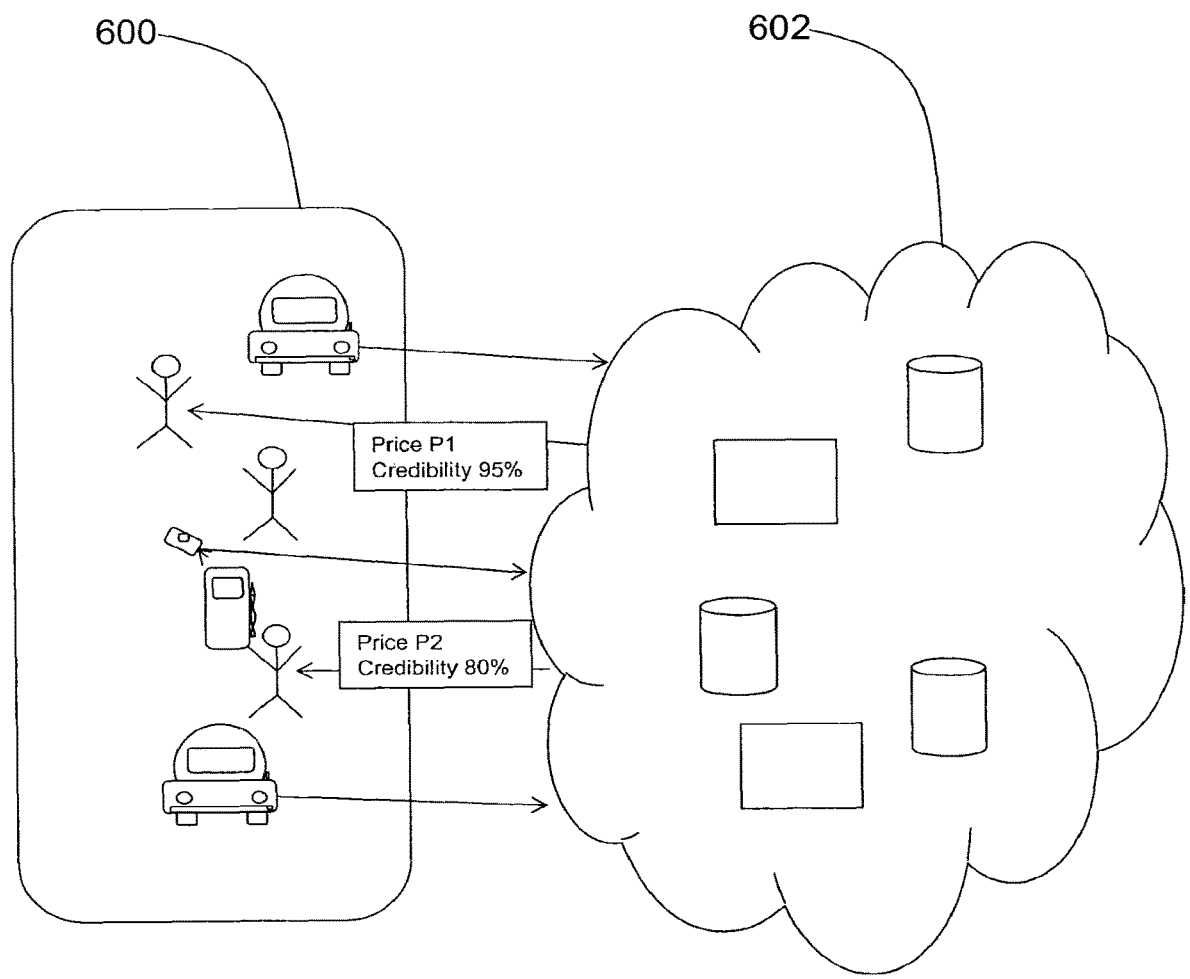
FIG. 6 illustrates the swarm principle of collecting pieces of product price information to be aggregated and provided to a community of users.

FIG. 6 illustrates a community 600 of users contributing to and using an embodiment of the method for determining product price information as discussed in the above. Computing and storage resources are provided and assigned in a cloud environment 602 (cloud computing environment) including several servers and storage devices.

It is illustrated that plural devices may, at the same time, provide data signals including information related to a price of a product, to a retailer of the product and to a type of the product, or alternatively or in addition provide a piece of product price information including the type of the product, the price of the product and the point of retail, together with the metadata including the geographic position of the capturing and the time of the capturing. This information is provided to cloud computing environment 602, e.g. via network 513.

At the same time, plural (e.g. other) users may request pricing information. Upon a corresponding request for product price information received e.g. at the database held or distributed in cloud computing environment 602, the credibility information is transmitted together with the product price information. In the example, a price P1 is indicated as having a credibility of 95%, while a price P2 is indicated as having a credibility of 80%.

Thus, accurate pricing information may be gathered and distributed quasi in real-time, and may further be assigned with credibility information allowing a user to estimate his own risk when driving to a point of retail with the aim of buying the product at the estimated price, that the driving was not worth the effort and the fuel used for the drive has been wasted since the estimated price was incorrect and/or is not available.

Figure 7:
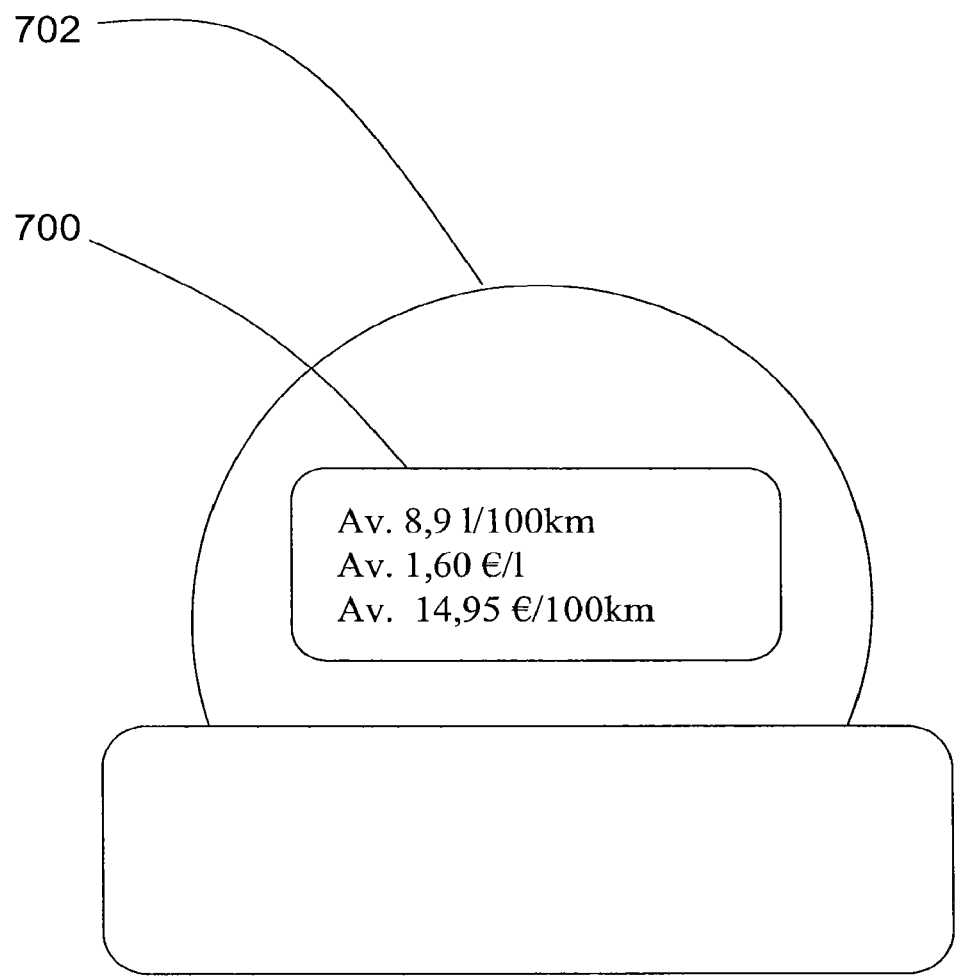
FIG. 7 illustrates a display of average expenses due to product consumption provided to a user as a reward for gathering product price information.

In FIG. 7, information related to a product consumption, such as fuel consumption, is determined by analyzing the piece of product price information and the metadata, or a plurality of pieces of product price information together with the corresponding metadata. The information related to product consumption may be displayed at a display 700 of a device 702.

For example, the information related to product consumption may relate to fuel and may be displayed at a cockpit display 700 of a vehicle, wherein the underlying data signal may have been captured e.g. by the vehicle's front camera. For example, average values of product consumption (fuel consumption) and of the price paid for the product (fuel) consumed by the vehicle may be derived and displayed.

By providing personal information related to product consumption, the user of the capturing device may receive a reward for this contribution to the method and/or community. This may help to motivate a large population of users to contribute to the method. Thus, product price information may be acquired with a high frequency, resulting in a high accuracy and/or reliability.

Figure 8:
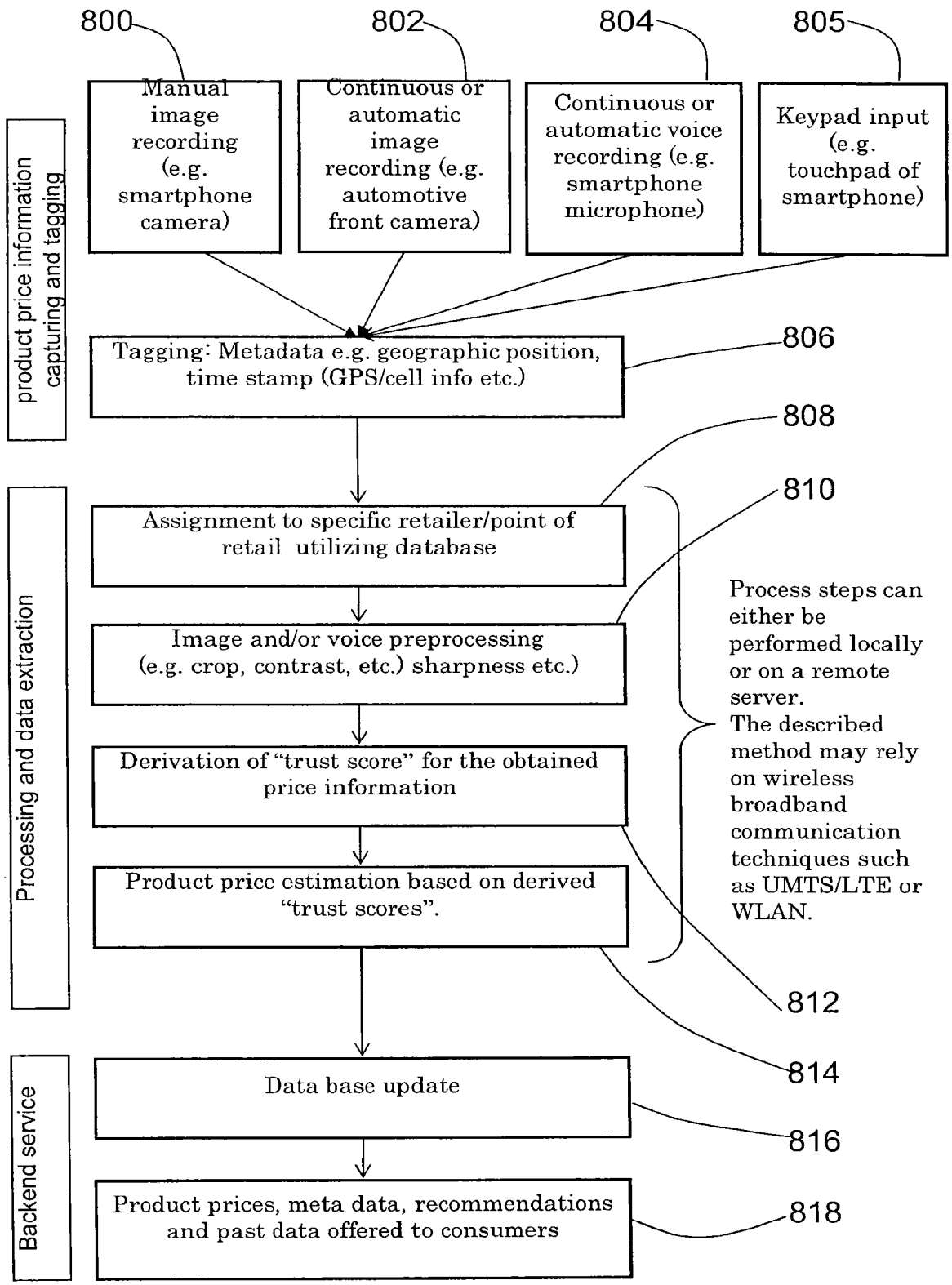
FIG. 8 illustrates a further embodiment of the method for product price determination.

In FIG. 8, a further embodiment of the method of determining product price information is illustrated.

At 800, a manual image recording is performed by a user using e.g. his smartphone camera.

At 802, a continuous or automatic image recording is performed e.g. by an automotive front camera. For example, image recording may be continuously performed when a vehicle is driving. Alternatively, the image recording may be triggered when it is determined that the vehicle approaches a vending centre such as a gas station, e.g. by evaluating data collected by a GPS (Global Positioning System) sensor.

At 804, a continuous or automatic voice recording is performed by a user using e.g. his smartphone microphone. For example, the user may activate his device (which may be in a stand-by mode) e.g. by uttering the voice input to be entered, thereby activating the device and entering the product price information by a single action. Further, the device may also be activated by any other means, e.g. by uttering a speech command (such as "listen"), by lifting or tilting the device (which by be determined using an acceleration sensor and/or a rate sensor) and/or by pressing a "dictation" button. Then, the user may conveniently enter the voice input, e.g. including the product price information.

At 805, a keypad input is entered e.g. via the touchpad of a smartphone.

Any of the data signals captured at 800, 802, and 804 may include information related to a price of a product (fuel, milk, butter, beer), to a retailer of the product and to a type of the product.

After the capturing, a tagging with metadata indicating e.g. a geographic position according to GPS coordinates or to a cell information of a cell-based communications network is included. Further, the data is tagged with a timestamp, indicating a time of capturing.

Processing steps 800 to 806 form a first phase of product price information capturing and tagging. The corresponding processing steps may be performed by user devices e g devices 500, 514 and 520.

At 808, the captured data is assigned to a specific retailer/point of retail utilizing e.g. a database including retailers such as e.g. fuel stations and their geographic location.

At 810, an image and/or voice pre-processing of the captured data signal is performed e.g. with respect to crop, contrast, sharpness, etc. Thus, a higher quality of the data signal is achieved, and a higher credibility of the derived piece of product price information can be obtained.

At 812, a trust score is derived for the obtained price information. The trust score may be determined e.g. as illustrated in FIG. 2 by function 200.

At 814, an (overall) product price estimation based on the derived trust scores is carried out. The product price estimation may include an aggregation or estimation as illustrated in FIG. 3.

Processing steps 808 to 814 form a second phase of processing and data extraction. These steps can either be performed locally, e.g. at devices 500, 514 and 520, or on a remote server, e.g. server 526. Further, these process steps can also be performed by any other device forming part of the cloud computing environment.

For any communication needed between components of the cloud computing environment, wireless broadband communication techniques such as UMTS/LTE or WLAN may be applied.

At 816, a database is updated with the estimated or aggregated product prices and corresponding trust scores.

At 818, product prices, metadata, recommendations and past data is offered to consumers, e.g. to the users having contributed to the gathering of pieces of product price information (e.g. for free), or to the public, possibly as a commercial service (to be paid for).

Steps 816 and 818 form the back end service, allowing the users to use the collectively gathered product price information.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method for determining product price information, including
    capturing a data signal including image data, voice data and/or keypad input data, the captured data signal including information related to a price of a product, to a point of retail of the product and to a type of the product;
    determining metadata including a geographic position of the capturing and a time of the capturing;
    determining a piece of product price information including the type of the product, the price of the product, and the point of retail by analyzing the captured data signal;
    determining a probability of correctness of the piece of product price information as credibility data of the piece of product price information, the probability of correctness being based at least in part on signal quality indicating whether noise has degraded the captured data signal and further depending on personal credibility data of a user of a device at which the data signal has been captured, the personal credibility data being derived from sources other than the data signal; and
    including the piece of product price information, the metadata and the respective credibility data into a database.

2. The method of claim 1, including aggregating, for at least one of a plurality of types of product and/or for at least one of a plurality of points of retail, pieces of product price information and the respective credibility data in the database.

3. The method of claim 2, including estimating, for at least one of the plurality of types of product and/or for at least one of the plurality of points of retail, product price information and credibility information of the estimated product price information based on a plurality of pieces of product price information and respective credibility data.

4. The method of claim 2, wherein upon a request for product price information received at the data base, the credibility information is transmitted together with the product price information.

5. The method of claim 2, wherein the product is fuel.

6. A mobile device, including
a capturing device including a still image camera, a video recorder, a microphone and/or a keypad adapted to capture a data signal relating to at least one of a price of a product, a type of the product, a point of retail, a document of retail and voice information; and
circuitry configured to
determine a time of capturing;
detect a geographic position at the time of capturing;
determine a piece of product price information including the type of the product, the price of the product, and the point of retail by analyzing the captured data signal;
determine a probability of correctness of the product price information as credibility data of the piece of product price information, the probability of correctness being based at least in part on signal quality indicating whether noise has degraded the captured data signal and further depending on personal credibility data of a user of a device at which the data signal has been captured, the personal credibility data being derived from sources other than the data signal; and
transmit, to a server over a network, of the captured data signal together with metadata including the time of capturing and the geographic position of capturing and the piece of product price information derived from the captured data signal together with the metadata and the credibility data.

7. A server, including
circuitry configured to
receive input data including information related to a type of a product, to a price of the product, and to a point of retail, the input data further including metadata, the metadata including a time of capturing of a data signal from which data signal the information is derived, and a geographic position of the capturing of the data signal;
determine a piece of product price information including the type of the product, the price of the product, and the point of retail by analyzing the captured data signal;
determine a probability of correctness of the piece of product price information as credibility data of the piece of product price information, the probability of correctness being based at least in part on signal quality indicating whether noise has degraded the captured data signal and further depending on personal credibility data of a user of a device at which the data signal has been captured, the personal credibility data being derived from sources other than the data signal;
access a local and/or remote storage; and
transmit the piece of product price information including the type of the product, the price of the product, and the point of retail together with the metadata and the credibility data to the storage.

8. The server of claim 7, wherein the circuitry is further configured to determine the piece of product price information by analyzing the information and/or the data signal.

9. The server of claim 8, wherein the circuitry is further configured to determine aggregated product price information by aggregating, for at least one of a plurality of types of the product and/or for at least one of a plurality of points of retail, pieces of product price information and the respective credibility data, and to provide the aggregated product price information for transmission to the storage.

10. The server of claim 8, wherein the circuitry is further configured to determine aggregated credibility information by aggregating, for at least one of a plurality of mobile devices from which input data is received the credibility data of the information included in the input data, and further to provide the aggregated credibility information for transmission to the storage.

11. A computer program including computer-program instructions, which when executed by a computer, cause the computer to perform a method comprising
capturing a data signal including image data, voice data and/or keypad input data, the captured data signal including information related to a price of a product, to a point of retail of the product and a type of the product;
determining metadata including a geographic position of the capturing and a time of the capturing;
determining a piece of product price information including the type of the product, the price of the product, and the point of retail by analyzing the captured data signal;
determining a probability of correctness of the piece of product price information as credibility data of the piece of product price information, the probability of correctness being based at least in part on signal quality indicating whether noise has degraded the captured data signal and further depending on personal credibility data of a user of a device at which the data signal has been captured, the personal credibility data being derived from sources other than the data signal; and
including the piece of product price information, the metadata and the respective credibility data into a database.

12. A method for determining product price information, including
capturing, by a microphone, a data signal including voice data including information related to a price of a product, to a point of retail of the product and/or a type of the product;
determining metadata including a geographic position of the capturing and a time of the capturing;
determining a piece of product price information including the type of the product, the price of the product, and the point of retail by analyzing the captured data signal;
determining a probability of correctness of the piece of product price information as credibility data of the piece of product price information, the probability of correctness being based at least in part on signal quality indicating whether noise has degraded the captured data signal and further depending on personal credibility data of a user of a device at which the data signal has been captured, the personal credibility data being derived from sources other than the data signal; and
including the piece of product price information, the credibility data, and the metadata into a data-base.

13. The method of claim 12, including determining information related to product consumption by analyzing the piece of product price information and the metadata; and displaying the information related to product consumption at a device having captured the data signal and/or the voice data.

14. The method of claim 12 including determining information related to product consumption by analyzing the piece of product price information and the metadata; and displaying the information related to product consumption at a device having captured the data signal and/or the voice data.

* * * * *